UNITED STATES PATENT OFFICE.

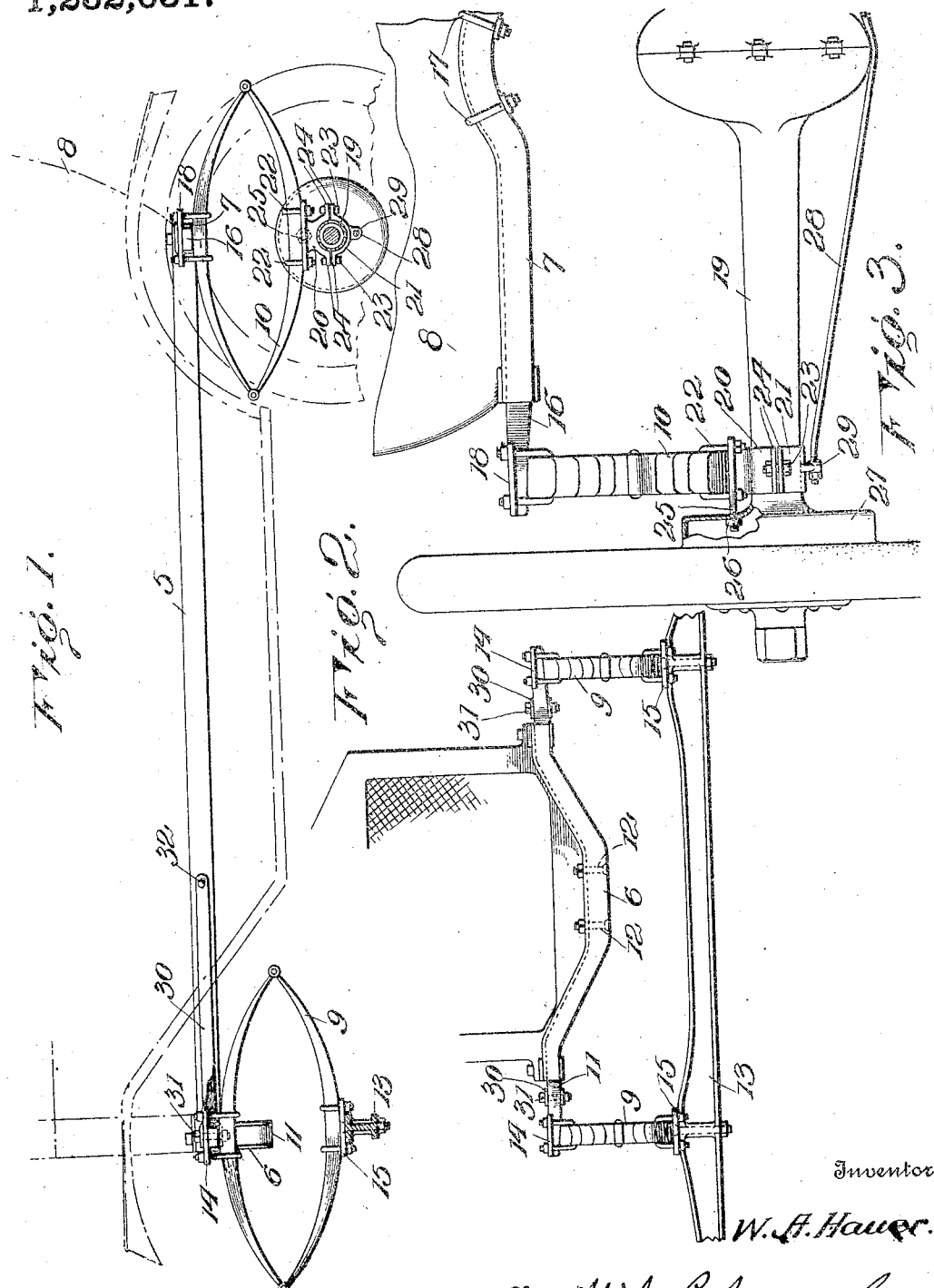

WILLIAM A. HAUER, OF OTTAWA, ILLINOIS.

VEHICLE SPRING-GEAR.

1,232,031.  Specification of Letters Patent.  Patented July 3, 1917.

Application filed October 12, 1916. Serial No. 125,294.

*To all whom it may concern:*

Be it known that I, WILLIAM A. HAUER, citizen of the United States, residing at Ottawa, in the county of La Salle and State of Illinois, have invented new and useful Improvements in Vehicle Spring-Gear, of which the following is a specification.

The spring gear which is the subject matter of the present application for patent has been designed more particularly for the well known Ford automobile, to improve the riding qualities thereof and to eliminate side sway of the axles.

The invention also has for its object to provide a novel combination and arrangement of parts which enables the improved spring gear to be readily applied to the car without any changes in the construction of the frame, the running gear or any other parts of the car.

In order that the invention may be better understood, reference is had to the accompanying drawing forming a part of this specification, in which drawing—

Figure 1 is a side elevation of the spring gear;

Fig. 2 is an end view showing the front springs, and

Fig. 3 is an end view of one of the rear springs.

Referring specifically to the drawing, 5 denotes the side members, 6 the front cross member, and 7 the rear cross member of the frame of the car, on which the body 8 is mounted in the usual manner. The car, as already stated, is the well known Ford car, and the invention is specially applicable thereto. The spring gear of the Ford car consists of transverse front and rear springs, and in carrying out the present invention I remove these springs and substitute therefor elliptic side springs extending longitudinally of the car. The front springs of the improved spring gear are shown at 9 and the rear springs at 10.

The front springs 9 are secured by the following means:

To the front cross member 6 of the car frame is secured a cross bar 11 projecting at its ends from the ends of the cross member a sufficient distance for attachment of the springs 9. The cross member is a channel bar, the channel being at the bottom, and the cross bar seats in the channel and is rigidly fastened to the cross member by bolts 12. The cross bar is above the front axle 13 of the car, and the springs are positioned therebetween, the top of the springs being secured to the cross bar by saddles 14 mounted on the ends of the latter. The springs are secured at the bottom to the axle by saddles 15.

The rear springs 10 are secured by the following means:

To the rear cross member 7 of the car frame is secured a cross bar 16 projecting from the ends thereof. This cross member is also a channel bar, and the cross bar seats in the channel thereof and is rigidly fastened by bolts 17, which latter may be the same bolts whereby the old spring was secured to the cross member. The cross bar is located above the rear axle of the car, and the springs 10 are positioned therebetween. The springs are secured at the top to the ends of the cross bar by suitable saddles 18, and at the bottom by saddles mounted on the housing 19 of the axle. The last-mentioned saddles are in two parts so that they may be assembled on the axle housing, said parts being indicated at 20 and 21 respectively. The upper part is flat at the top to afford a seat for the spring, and the latter is secured by U-bolts 22. The two parts are clamped together around the axle housing and securely held thereon by bolts 23 passing through matching outstanding flanges 24 at the meeting ends of the two parts. The top half of the saddle also has a laterally extending stem 25 which is threaded at its outer end to take a nut 26. At the ends of the axle housing are enlargements 27 to inclose the emergency brakes. In the side of these housings are openings in which are secured spring hangers to which the ends of the old springs are secured. I remove these hangers, and insert the stems 25 into the openings and fasten the stems by the nuts 26, the latter being screwed on the stems on the inside of the housings. These stems are provided to prevent the spring saddles from slipping around on the axle housing.

The rear axle of the car is also strengthened by a truss rod 28 secured at its ends to lugs 29 on the bottom sections 21 of the spring saddles.

The front cross bar 11 is braced by bars 30 extending between its ends and the side members 5 of the car frame. These brace bars are forked at their front ends to straddle the cross bar and they are secured to the latter by bolts 31. The brace bars extend rearwardly from the cross bar to the side members, and they are bolted thereto as shown at 32.

The spring gear hereinbefore described is strong and durable and it eliminates all side sway and insures maximum riding comfort. The parts can be readily applied without any changes in the structure of any portion of the car, it being necessary only to remove the old springs and their attaching means, and substitute therefor the new springs and their attaching means.

I claim:—

The combination with a motor-vehicle frame having side members and a front cross member; of a cross bar fixed to the cross member and projecting from the ends thereof above the front axle of the vehicle, springs interposed between the ends of the cross bar and the axle, and brace bars secured to the ends of the cross bar and extending rearward to the side members and secured thereto.

In testimony whereof I affix my signature.

WILLIAM A. HAUER.